(12) United States Patent
Paik

(10) Patent No.: US 8,347,129 B2
(45) Date of Patent: Jan. 1, 2013

(54) SYSTEMS ON CHIP WITH WORKLOAD ESTIMATOR AND METHODS OF OPERATING SAME

(75) Inventor: In-soo Paik, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 410 days.

(21) Appl. No.: 12/651,724

(22) Filed: Jan. 4, 2010

(65) Prior Publication Data

US 2010/0175066 A1 Jul. 8, 2010

(30) Foreign Application Priority Data

Jan. 5, 2009 (KR) ........................ 10-2009-0000418

(51) Int. Cl.
*G06F 1/32* (2006.01)
(52) U.S. Cl. .................... 713/320; 713/300; 713/322
(58) Field of Classification Search .................. None
See application file for complete search history.

(56) References Cited

U.S. PATENT DOCUMENTS

| | | | | |
|---|---|---|---|---|
| 7,971,082 B2* | 6/2011 | Mathur et al. | ................ | 713/320 |
| 2004/0216113 A1 | 10/2004 | Armstrong et al. | | |
| 2007/0234091 A1* | 10/2007 | Vishin et al. | ................... | 713/322 |
| 2008/0301474 A1* | 12/2008 | Bussa et al. | ................... | 713/300 |

FOREIGN PATENT DOCUMENTS

| | | |
|---|---|---|
| JP | 11-296252 | 10/1999 |
| JP | 2003-196083 | 7/2003 |
| KR | 1019990082730 A | 11/1999 |

* cited by examiner

*Primary Examiner* — Dennis M Butler
(74) *Attorney, Agent, or Firm* — Myers Bigel Sibley & Sajovec, P.A.

(57) ABSTRACT

A system on chip (SOC) includes a processor circuit configured to receive instruction information from an external source and to execute an instruction according to the received instruction information and a workload estimator circuit configured to monitor instruction codes executed in the processor circuit, to generate an estimate of a workload of the processor circuit based on the monitored instruction codes and to generate power supply voltage control signal based on the estimate of the workload. The SOC may further include a power management integrated circuit (PMIC) configured to receive the control signal and to adjust a power supply voltage provided to the SOC in response to the control signal.

9 Claims, 2 Drawing Sheets

SYSTEMS ON CHIP WITH WORKLOAD ESTIMATOR AND METHODS OF OPERATING SAME

CROSS-REFERENCE TO RELATED APPLICATIONS

This application claims the benefit of Korean Patent Application No. 10-2009-0000418, filed on Jan. 5, 2009, in the Korean Intellectual Property Office, the disclosure of which is incorporated herein by reference in its entirety.

BACKGROUND

The inventive subject matter relates to systems on a chip (SOC) and methods of operation thereof and, more particularly, to control of power supply voltage in a SOC.

By applying low power technologies such as dynamic voltage and frequency scaling (DVFS) or adaptive body biasing (ABB) to a mobile SOC, an energy reduction of at least 30% can be expected depending on application programs. Use of these two low power technologies typically involves a workload estimation operation.

SUMMARY

In some embodiments of the inventive subject matter, a system on chip (SOC) includes a processor circuit configured to receive instruction information from an external source and to execute an instruction according to the received instruction information. The SOC further includes a workload estimator circuit configured to monitor instruction codes executed in the processor circuit, to generate an estimate of a workload of the processor circuit based on the monitored instruction codes and to generate a power supply voltage control signal based on the estimate of the workload. The SOC may further include a power management integrated circuit (PMIC) configured to receive the power supply voltage control signal and to adjust a power supply voltage provided to the SOC in response to the power supply voltage control signal.

The workload estimator circuit may include a counter circuit configured to monitor the instruction codes executed in the processor circuit for a time period, to determine a number of instruction codes and a number of idle codes executed during the time period and to generate the estimate of the workload based on the determined number of instruction codes and the determined number of idle codes executed during the time period. The workload estimator circuit may also include an estimation kernel circuit configured to compare the estimate of the workload to a predetermined reference value and to generate the power supply voltage control signal responsive to the comparison.

The workload estimator circuit may also include an exception processor circuit configured to receive an exception processing signal from an external source, to compensate the estimate of the workload responsive to the exception processing signal and to provide the compensated estimate of the workload to the estimation kernel circuit. The estimation kernel circuit may be configured to compare the compensated estimate of the workload to the predetermined reference value and to generate the power supply voltage control signal responsive to the comparison The SOC may further include a direct memory access (DMA) controller circuit configured to receive an input/output instruction from the processor circuit to directly access a memory according to the received input/output instruction, and wherein the DMA controller circuit is configured to generate the exception processing signal.

In some embodiments, a SOC includes a multi-core processor circuit including a plurality of processor cores and a plurality of workload estimator circuits. Respective ones of the workload estimator circuits may be configured to monitor instruction codes executed by respective ones of the plurality of processor cores, to generate respective estimates of respective workloads of the respective processor cores and to adjust a power supply voltage provided to the multi-core processor circuit based on the respective estimates of respective workloads of the respective processor cores.

Additional embodiments provide methods of driving a SOC including at least one processor circuit. Instruction codes are executed in the at least one processor circuit. The executed instruction codes are monitored and an estimate of a workload of the at least one processor circuit is generated responsive to the monitoring. A power supply voltage of the SOC is adjusted responsive to the estimate of the workload.

BRIEF DESCRIPTION OF THE DRAWINGS

Exemplary embodiments of the inventive subject matter will be more clearly understood from the following detailed description taken in conjunction with the accompanying drawings in which.

DETAILED DESCRIPTION OF EMBODIMENTS

Some embodiments of the inventive subject matter will now be described hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like items throughout.

It will be understood that when an item is referred to as being "connected" or "coupled" to another item, it can be directly connected or coupled to the other item or intervening items may be present. In contrast, when an item is referred to as being "directly connected" or "directly coupled" to another item, there are no intervening items present. As used herein, the term "and/or" includes any and all combinations of one or more of the associated listed items and may be abbreviated as "/".

It will be understood that, although the terms first, second, etc. may be used herein to describe various items, these items should not be limited by these terms. These terms are only used to distinguish one item from another. For example, a "first" item could be termed a "second" item, and, similarly, a "second" item could be termed a "first" item without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated items or operations but do not preclude the presence or addition of one or more other items or operations.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
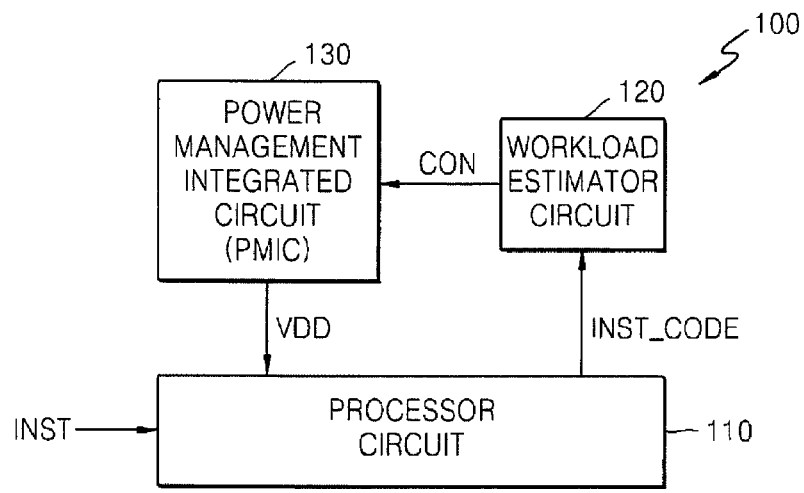
FIG. 1 is a block diagram of a system on chip (SOC) according to some embodiments of the inventive subject matter.

FIG. 1 is a block diagram of a system on chip (SOC) 100 according to some embodiments of the inventive subject matter. The SOC 100 may include a processor circuit 110 and a workload estimator circuit 120. Also, the SOC 100 may further include a power management integrated circuit (PMIC) 130.

The processor circuit 110 receives instruction information INST from an external source, and is executed according to the instruction information INST. The instruction information INST may be input to the processor circuit 110 from, for example, a memory (not shown) included in the SOC 100. In general, the instruction information INST input to the processor circuit 110 may be viewed as being executed using four stages. In a first stage, an instruction code is fetched according to the input instruction information INST. In a second stage, the fetched instruction code is decoded. In a third stage, the decoded instruction code is executed. In a fourth stage, according to the executed instruction, data is stored in a register or a memory or data is read from the register or the memory. Such operations of the processor circuit 110 are well known to one of ordinary skill in the art, and thus, a detailed description thereof will be omitted here.

Referring to FIG. 1, the workload estimator circuit 120 monitors the instruction codes executed in the processor circuit 110, estimates a workload of the processor circuit 110, and outputting a control signal CON according to the estimated workload. For example, the workload estimator circuit 120 may monitor the instruction code decoded in the processor circuit 110 by using a pipeline inside the processor circuit 110. The workload estimator circuit 120 may monitor the instruction codes executed in the processor circuit 110 for a first time period, may estimate the number of instruction codes executed during the first time period and the number of idle codes executed during the first time period, and thus may estimate the workload of the processor circuit 110. The idle codes may be instruction codes allocated to an idle cycle in which the processor circuit 110 does not operate, and may correspond to a no operation (NOP) instruction or a wait for interrupt (WFI) instruction.

The workload estimator circuit 120 monitors the instruction codes executed in the processor circuit 110 during the first time period and estimates a ratio of the number of total instruction codes executed during the first time period to the number of idle codes executed during the first time period. By referring to the estimated ratio, it is possible to determine a proportion of time that the processor circuit 110 is in an idle status during the first time period, and by using this ratio, the workload of the processor circuit 110 may be estimated. In other words, the SOC 100 may monitor instruction codes executed in the processor circuit 110 without changing hardware architecture, and thus may estimate a workload.

For example, in order to estimate a workload of the processor circuit 110, instruction codes may be monitored for 5 cycles, for example, ADD, SUB, MUL, NOP and JUMP instructions. From among these 5 instruction codes, only the NOP instruction is an idle code, and the ADD, SUB, MUL and JUMP instructions are not idle codes, thus, the workload of the processor circuit during the 5 cycles may be obtained by dividing the number of instruction codes that are not idle codes by the number of total instruction codes, that is, $4/5=0.8$.

The first time period may have various values. For example, when time taken for the processor circuit to execute one cycle is n seconds and when the workload of the processor circuit for 100 cycles is estimated, the first time period may be set as 100n seconds. The first time period is time during which the instruction codes executed in the processor circuit 110 are monitored, and in this regard, it is well known to one of ordinary skill in the art that the first time period may be changed by arranging a counter, thus, a detailed description thereof will be omitted here.

The PMIC 130 is a circuit for adjusting a power voltage VDD of the SOC 100, and operates in response to the control signal CON generated by the workload estimator circuit 120. The control signal CON corresponds to whether the power voltage VDD increases or decreases. Also, the control signal CON corresponds to an amount to increase or decrease the power voltage VDD. The control signal CON may be a control signal having at least one bit or may be a voltage signal having an analogue value.

The workload estimator circuit 120 monitors the instruction codes executed in the processor circuit 110, estimates the workload of the processor circuit 110 and outputs the control signal CON according to the estimated workload. The PMIC 130 may increase or decrease the power voltage VDD of the processor circuit 110 according to the control signal CON generated by the workload estimator circuit 120, and thus may control energy consumption by the SOC 100.

For example, when the estimated workload is greater than a predetermined reference value, the workload estimator circuit 120 may determine that the processor circuit 110 is active and thus may output the control signal CON to increase the power supply voltage VDD. When the estimated workload is less than the predetermined reference value, the workload estimator circuit 120 may determine that the processor circuit 110 is not active and may responsively output the control signal CON to decrease the power supply voltage VDD. The predetermined reference value may vary.

Figure 2:
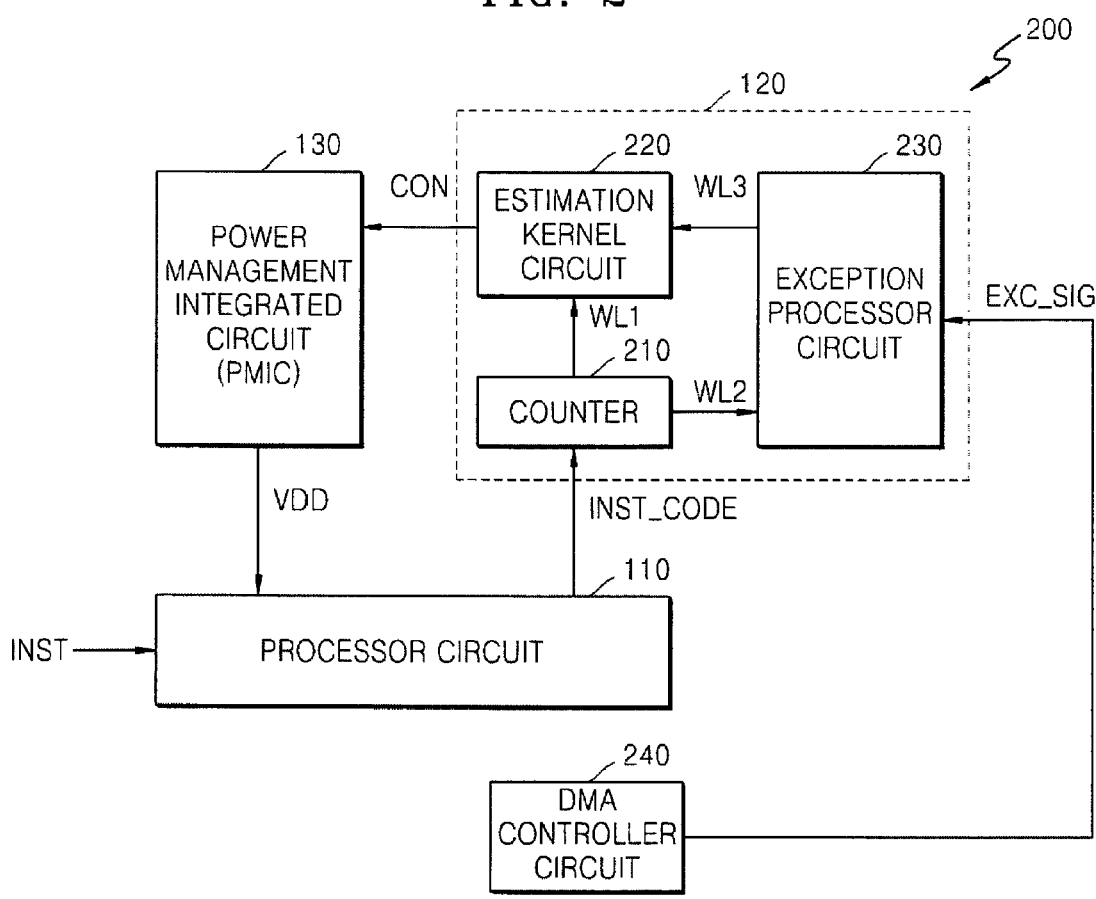
FIG. 2 is a block diagram of a SOC according to further embodiments of the inventive subject matter.

FIG. 2 is a block diagram of a SOC 200 according to further embodiments of the inventive subject matter. The SOC 200 may include a processor circuit 110, a workload estimator circuit 120 and a PMIC 130. Also, the SOC 200 may further include a direct memory access (DMA) controller circuit 240. Operations of the processor circuit 110 and the PMIC 130 are similar to those that are described with reference to FIG. 1, thus, further descriptions thereof will be omitted.

Referring to FIG. 2, the workload estimator circuit 120 may include a counter 210, an estimation kernel circuit 220, and an exception processing unit 230. The counter 210 receives an instruction code INST_CODE from the processor circuit 110. The counter 210 monitors instruction codes executed in the processor circuit 110 for a first time period and counts the number of instruction codes executed during the first time period and the number of idle codes executed during the first time period and generates workload estimate signals WL1, WL2 that indicate a workload based thereon. The estimation of the workload of the processor circuit 110 is described above with reference to FIG. 1, and thus, further description thereof will be omitted. The counter 210 outputs the workload estimate signals WL1, WL2 to the estimation kernel circuit 220 and the exception processor circuit 230, respectively.

The exception processor circuit 230 is coupled to a direct memory access (DMA) controller circuit 240 and may function to control a power supply voltage responsive to the DMA controller circuit 240 even if the processor circuit 110 is in an idle state. In particular, even if the workload of the processor circuit 110 is less than a predetermined reference value due to the number of idle codes transmitted to the processor circuit 110, if the DMA controller circuit 240 is operating, it may be necessary to adjust the power voltage of the SOC 200.

The exception processor circuit 230 receives an exception processing signal EXC_SIG generated by the DMA 240 and receives the workload estimate signal WL2 corresponding to a workload of the processor circuit 110 estimated by the counter 210. The workload estimate signal WL2, which is output from the counter 210 to the exception processor circuit 230, may have a value equivalent to a value of the workload estimate signal WL1, which is output from the counter 210 to the estimation kernel circuit 220. The exception processor circuit 230 may compensate for the workload estimate signal WL2 received from the counter 210 according to the exception processing signal EXC_SIG. The exception processing signal EXC_SIG may indicate whether or not the DMA controller circuit 240 is operating, and by referring to the exception processing signal EXC_SIG, when it is determined that the DMA controller circuit 240 is operating, a compensated workload estimate signal WL3 obtained by adding a constant value to the value of the workload WL2 received from the counter 210 may be output to the estimation kernel circuit 220.

The DMA controller circuit 240 may receive input/output instructions from the processor circuit 110, and may directly access a memory (not shown) according to the input/output instructions. After the DMA controller circuit 240 receives an input/output instruction from the processor circuit 110, the DMA controller circuit 240 may directly access the memory, (not shown) bypassing the processor circuit 110, may generate the exception processing signal EXC_SIG while the DMA controller circuit 240 directly accesses the memory (not shown), and may output the exception processing signal EXC_SIG to the exception processor circuit 230. The processing method performed by the exception processor circuit 230 with respect to the exception processing signal EXC_SIG is described above.

The estimation kernel circuit 220 receives workload estimate signals WL1 and WL3 from counter 210 and the exception processor circuit 230, respectively. When the exception processing signal EXC_SIG is not generated, the estimation kernel circuit 220 may not operate according to the workload estimate signal WL3 output from the exception processor circuit 230, and may instead operate according to the workload WL1 output from the counter 210 and thus may output the control signal CON accordingly. When the exception processing signal EXC_SIG is generated, the estimation kernel circuit 220 may disregard the workload estimate signal WL1 output from the counter 210, and instead may consider the workload WL3 output from the exception processor circuit 230 and output the control signal CON accordingly. The case in which the exception processing signal EXC_SIG is not generated corresponds to a case in which the DMA controller circuit 240 is not operating, and the case in which the exception processing signal EXC_SIG is generated corresponds to a case in which the DMA controller circuit 240 is operating.

The estimation kernel circuit 220 may receive the workload WL1 corresponding to a workload of the processor circuit 110 from the counter 210, and thus may compare the workload WL1 to the predetermined value. According to a result of the comparison, the estimation kernel circuit 220 outputs the control signal CON, increasing or decreasing the power supply voltage VDD. The estimation kernel circuit 220 may output the control signal CON by using the workload estimate signal WL1 in various ways.

As described above, the estimation kernel circuit 220 may receive the workload estimate signal WL3 output from the exception processor circuit 230, may compare the workload estimate signal WL3 to the predetermined reference value, and may output the control signal CON accordingly. It will be understood by one of ordinary skill in the art that various changes to the arrangement of FIG. 2 can be made in other embodiments of the inventive subject matter.

Figure 3:
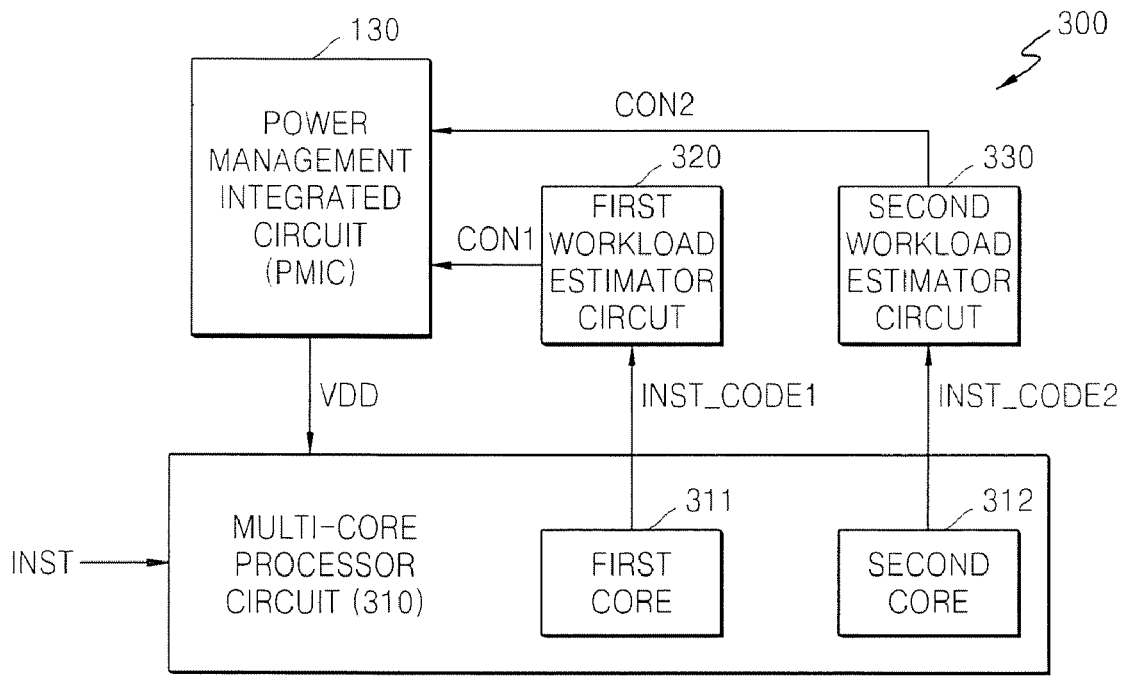
FIG. 3 is a block diagram of a SOC according to further embodiments of the inventive subject matter.

FIG. 3 is a block diagram of a SOC 300 according to further embodiments of the inventive subject matter. The SOC 300 may include a multi-core processor circuit 310 including a plurality of cores 311 and 312, a plurality of workload estimator circuits 320 and 330, and a PMIC 130. The SOC 300 according to the present embodiment may operate similarly to the SOC 100 of FIG. 1. However, unlike the processor circuit 110 of FIG. 1, a processor circuit according to the present embodiment is the multi-core processor circuit 310 including the plurality of cores 311 and 312.

Referring to FIG. 3, respective ones of the plurality of workload estimator circuits 320 and 330 may be connected to respective ones of the plurality of cores 311 and 312. For example, the first workload estimator circuit 320 may be connected to the first core 311 and the second workload estimator circuit 330 may be connected to the second core 312. The plurality of workload estimator circuits 320 and 330 operate in a manner similar to the workload estimator circuit 120 of FIG. 1. In particular, the first workload estimator circuit 320 may monitor instruction codes executed in the first core 311 of the multi-core processor circuit 310 and may responsively estimate a workload of the first core 311 of the multi-core processor circuit 310 and adjust a power voltage of the multi-core processor circuit 310 according to the estimated workload. The second workload estimator circuit 330 may operate in a manner similar to the first workload estimator circuit 320.

The PMIC 130 receives control signals CON1 and CON2 from the first workload estimator circuit 320 and the second workload estimator circuit 330, respectively, and responsively adjusts a power supply voltage VDD of the SOC 300. The control signals CON1 and CON2 may be digital control signals of one or more bits, or may be analog voltages.

Figure 4:
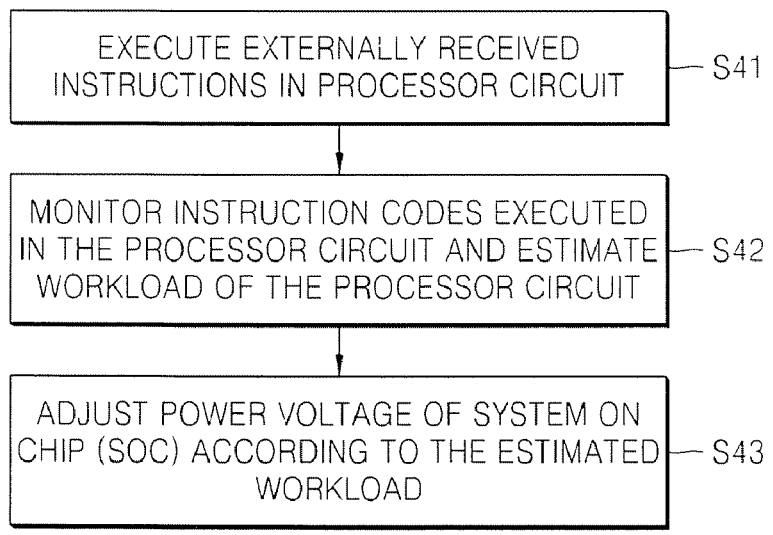
FIG. 4 is a flowchart illustrating operations for driving a SOC according to some embodiments of the inventive subject matter.

FIG. 4 is a flowchart illustrating operations for driving a SOC according to some embodiments of the inventive subject matter. Referring to FIG. 4, instructions that are received from an external source are executed in a processor circuit (block S41). The instruction codes that are executed in the processor circuit are monitored and a workload of the processor circuit estimated (block S42). A power supply voltage of the SOC is adjusted according to the workload estimate (block S43).

The instruction codes executed in the processor circuit may be monitored for a first time period, the number of instruction codes executed during the first time period and the number of idle codes executed during the first time period may be estimated, and then the workload of the processor circuit is estimated. An example of estimation of the workload of the processor circuit is described above with reference to FIG. 1.

The workload estimate may be compared to a predetermined reference value, and the power supply voltage of the SOC may be adjusted according to a result of the comparison. The adjustment of a power supply voltage is described above with reference to FIG. 1.

While the inventive subject matter has been particularly shown and described with reference to exemplary embodiments thereof, it will be understood that various changes in form and details may be made therein without departing from the spirit and scope of the following claims.

What is claimed is:

1. A system on chip (SOC) comprising:
   a processor circuit configured to receive instruction information from an external source and to execute an instruction according to the received instruction information; and
   a workload estimator circuit configured to monitor instruction codes and idle codes executed in the processor circuit, to generate an estimate of a workload of the processor circuit based on the monitored instruction codes and idle codes and to generate a power supply voltage control signal based on the estimate of the workload.

2. The SOC of claim 1, further comprising a power management integrated circuit (PMIC) configured to receive the power supply voltage control signal and to adjust a power supply voltage provided to the SOC in response to the power supply voltage control signal.

3. A system on chip (SOC) comprising:
   a processor circuit configured to receive instruction information from an external source and to execute an instruction according to the received instruction information; and
   a workload estimator circuit configured to monitor instruction codes executed in the processor circuit, to generate an estimate of a workload of the processor circuit based on the monitored instruction codes and to generate a power supply voltage control signal based on the estimate of the workload, wherein the workload estimator circuit comprises a counter circuit configured to monitor the instruction codes executed in the processor circuit for a time period, to determine a number of instruction codes and a number of idle codes executed during the time period and to generate the estimate of the workload based on the determined number of instruction codes and the determined number of idle codes executed during the time period.

4. The SOC of claim 3, wherein the workload estimator circuit further comprises an estimation kernel circuit configured to compare the estimate of the workload to a predetermined reference value and to generate the power supply voltage control signal responsive to the comparison.

5. The SOC of claim 4:
   wherein the workload estimator circuit further comprises an exception processor circuit configured to receive an exception processing signal from an external source, to compensate the estimate of the workload responsive to the exception processing signal and to provide the compensated estimate of the workload to the estimation kernel circuit; and
   wherein the estimation kernel circuit is configured to compare the compensated estimate of the workload to the predetermined reference value and to generate the power supply voltage control signal responsive to the comparison.

6. The SOC of claim 5, further comprising a direct memory access (DMA) controller circuit configured to receive an input/output instruction from the processor circuit to directly access a memory according to the received input/output instruction and wherein the DMA controller circuit is configured to generate the exception processing signal.

7. A SOC comprising:
   a multi-core processor circuit comprising a plurality of processor cores; and
   a plurality of workload estimator circuits, respective ones of which are configured to monitor instruction codes executed by respective ones of the plurality of processor cores, to generate respective estimates of respective workloads of the respective processor cores and to adjust a power supply voltage provided to the multi-core processor circuit based on the respective estimates of respective workloads of the respective processor cores, wherein each workload estimator circuit comprises a counter circuit configured to monitor the instruction codes executed in the corresponding processor core for a time period, to determine a number of instruction codes and a number of idle codes executed during the time period and to generate an estimate of workload for the corresponding processor core based on the determined number of instruction codes and the determined number of idle codes executed during the time period.

8. A method of operating a SOC comprising at least one processor circuit, the method comprising:
   monitoring instruction codes executed in the at least one processor circuit for a time period;
   determining a number of instruction codes and a number of idle codes executed during the time period;
   generating an estimate of a workload of the at least one processor circuit based on the determined number of instruction codes and the determined number of idle codes; and
   adjusting a power supply voltage of the SOC according to the estimate of the workload.

9. The method of claim 8, wherein adjusting a power supply voltage of the SOC comprises comparing the estimate of the workload to a predetermined reference value and adjusting the power supply voltage of the SOC responsive to the comparison.

* * * * *